United States Patent
Nakanishi et al.

(10) Patent No.: US 10,823,917 B2
(45) Date of Patent: *Nov. 3, 2020

(54) OPTICAL CONNECTION COMPONENT

(71) Applicant: Sumitomo Electric Industries, Ltd., Osaka (JP)

(72) Inventors: Tetsuya Nakanishi, Yokohama (JP); Yasuomi Kaneuchi, Yokohama (JP); Yuuichi Mitose, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/712,390

(22) Filed: Dec. 12, 2019

(65) Prior Publication Data
US 2020/0116948 A1   Apr. 16, 2020

Related U.S. Application Data

(63) Continuation of application No. 15/883,388, filed on Jan. 30, 2018, now Pat. No. 10,539,746, which is a
(Continued)

(51) Int. Cl.
| | |
|---|---|
| *G02B 6/38* | (2006.01) |
| *G02B 6/036* | (2006.01) |
| *G02B 6/42* | (2006.01) |

(52) U.S. Cl.
CPC ......... *G02B 6/3829* (2013.01); *G02B 6/0365* (2013.01); *G02B 6/03616* (2013.01);
(Continued)

(58) Field of Classification Search
CPC ............... G02B 6/036; G02B 6/03616; G02B 6/03638; G02B 6/3829; G02B 6/3887; C03B 2203/23
(Continued)

(56) References Cited

U.S. PATENT DOCUMENTS

| | | | |
|---|---|---|---|
| 5,138,676 | A | 8/1992 | Stowe et al. |
| 5,517,590 | A | 5/1996 | Auborn |

(Continued)

FOREIGN PATENT DOCUMENTS

| | | |
|---|---|---|
| CN | 1975486 A | 6/2007 |
| CN | 101852898 A | 10/2010 |

(Continued)

OTHER PUBLICATIONS

Kim et al., "Fictive temperature of silica glass optical fibers—re-examination," Journal of Non-Crystalline Solids, vol. 286, 2001, pp. 132-138 [Cited in Parent].
(Continued)

*Primary Examiner* — Robert Tavlykaev
(74) *Attorney, Agent, or Firm* — Baker Botts L.L.P.; Michael A. Sartori

(57) ABSTRACT

The embodiment relates to an optical connection component including a bent optical fiber having a bent portion including a region where a curvature of the bent portion is maintained at 0.4 [1/mm] or more while substantially no bending stress remains. The bent optical fiber comprises a core, a first cladding, a second cladding, and a third cladding. Based on the third cladding, a relative refractive index difference $\Delta 1$ of the core, a relative refractive index difference $\Delta 2$ of the first cladding, and a relative refractive index difference $\Delta 3$ of the second cladding satisfy relationships of $\Delta 1 > \Delta 2 > \Delta 3$ and $\Delta 3 < -0.5$ [%]. The product V3 of the $\Delta 3$ and a cross-sectional area S of the second cladding is less than $-200$ [%·µm²]. The curvature in the bent portion is 0.6 [1/mm] or less over an entire length of the bent portion.

10 Claims, 8 Drawing Sheets

Related U.S. Application Data continuation of application No. PCT/JP2015/072120, filed on Aug. 4, 2015.

(52) U.S. Cl.
CPC ........ G02B 6/4285 (2013.01); C03B 2203/23 (2013.01); G02B 6/423 (2013.01)

(58) Field of Classification Search
USPC .......................................... 385/123, 126–128
See application file for complete search history.

(56) References Cited

U.S. PATENT DOCUMENTS

| | | | |
|---|---|---|---|
| 5,923,802 | A | 7/1999 | Giebel |
| 6,390,690 | B1 | 5/2002 | Meis |
| 8,731,358 | B2 * | 5/2014 | Pare .................. G02B 6/02023 385/126 |
| D777,681 | S | 1/2017 | Okamoto |
| 2008/0192241 | A1 | 8/2008 | He |
| 2008/0232750 | A1 | 9/2008 | Inaba et al. |
| 2009/0317040 | A1 | 12/2009 | Yoshida |
| 2010/0061678 | A1 | 3/2010 | Swinehart |
| 2010/0166373 | A1 | 7/2010 | Nakanishi |
| 2010/0247042 | A1 | 9/2010 | Suzuki |
| 2011/0058772 | A1 | 3/2011 | Bylander |
| 2011/0198765 | A1 | 8/2011 | Sasaki |
| 2012/0155811 | A1 | 6/2012 | Chiang |
| 2015/0177464 | A1 | 6/2015 | Ikeya |
| 2015/0226915 | A1 | 8/2015 | Kawaguchi |
| 2015/0336842 | A1 | 11/2015 | Kaneuchi |
| 2016/0016843 | A1 | 1/2016 | Kaneuchi |
| 2016/0252681 | A1 | 9/2016 | Ishiguro |
| 2016/0291261 | A1 | 10/2016 | Izumi |

FOREIGN PATENT DOCUMENTS

| | | | |
|---|---|---|---|
| JP | 2004-078028 | A | 3/2004 |
| JP | 2004-325622 | A | 11/2004 |
| JP | 2006-292740 | A | 10/2006 |
| JP | 2008-152229 | A | 7/2008 |
| JP | 2010-049173 | A | 3/2010 |
| JP | 2010-128112 | A | 6/2010 |
| JP | 2011-007946 | A | 1/2011 |
| JP | 2011-085718 | A | 4/2011 |
| JP | 2011-102964 | A | 5/2011 |
| JP | 2012-027454 | A | 2/2012 |
| JP | 2013-504785 | A | 2/2013 |
| JP | 2013-104884 | A | 5/2013 |
| JP | 5226797 | B2 | 7/2013 |
| JP | 5506322 | B2 | 5/2014 |
| JP | 2014-142613 | A | 8/2014 |
| WO | 2010/044273 | A1 | 4/2010 |
| WO | 2011/031612 | A1 | 3/2011 |

OTHER PUBLICATIONS

Non-Final Office Action dated Jun. 27, 2019 for U.S. Appl. No. 16/235,003.
Final Office Action dated Oct. 10, 2019 for U.S. Appl. No. 16/235,003.
Non-Final Office Action dated Jul. 17, 2018 for U.S. Appl. No. 15/883,388.
Final Office Action dated Nov. 23, 2018 for U.S. Appl. No. 15/883,388.
Non-Final Office Action dated Apr. 25, 2019 for U.S. Appl. No. 15/883,388.
Notice of Allowance dated Sep. 12, 2019 for U.S. Appl. No. 15/883,388.
Notice of Allowance dated Nov. 20, 2019 for U.S. Appl. No. 15/883,388.

* cited by examiner

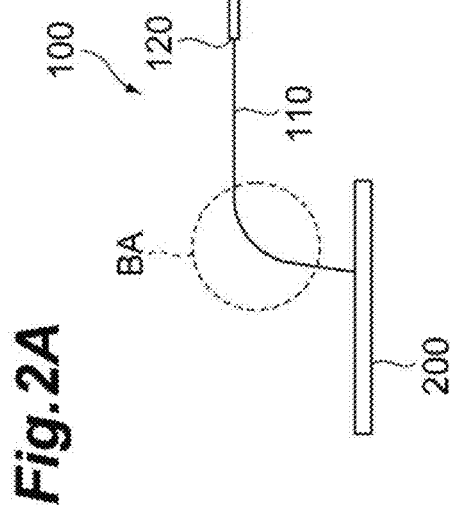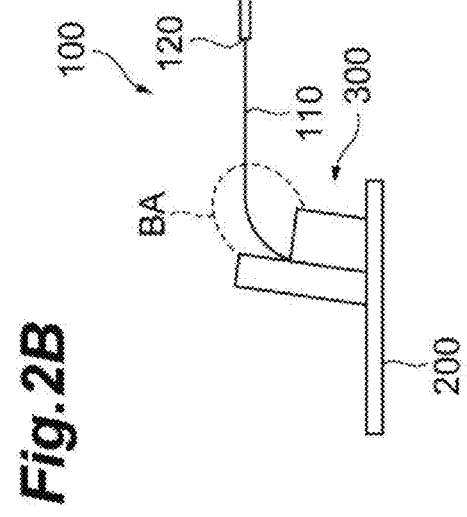

Fig.6

|  | UNIT | SAMPLE 1 | SAMPLE 2 | SAMPLE 3 | SAMPLE 4 | SAMPLE 5 | SAMPLE 6 | SAMPLE 7 |
|---|---|---|---|---|---|---|---|---|
| Δ1 | % | 0.35 | 0.36 | 0.36 | 0.36 | 0.37 | 0.36 | 0.30 |
| Δ2 | % | 0.02 | 0.01 | 0.015 | 0.01 | -0.01 | 0 | 0 |
| Δ3 | % | -0.34 | -0.41 | -0.45 | -0.53 | -0.53 | -0.67 | -0.72 |
| r1 | μm | 3.75 | 3.76 | 3.76 | 3.98 | 3.98 | 3.682 | 3.682 |
| r2 | μm | 8.6 | 8.7 | 8.6 | 8.6 | 9.2 | 8.53 | 8.53 |
| r3 | μm | 13.5 | 13.6 | 13.5 | 13.6 | 14.5 | 13.487 | 13.487 |
| r1/r2 |  | 0.44 | 0.43 | 0.44 | 0.46 | 0.43 | 0.43 | 0.43 |
| r2/r3 |  | 0.64 | 0.64 | 0.64 | 0.63 | 0.63 | 0.63 | 0.63 |
| V3 | %·μm² | -116 | -141 | -153 | -185 | -209 | -230 | -247 |
| λc@L=22m | nm | 1180 | 1150 | 1200 | 1240 | 1220 | 1247 | 1245 |
| INSERTION LOSS — AVERAGE VALUE | dB | 3.2 | 3.5 | 2.2 | 1 | 0.4 | 0.25 | 0.24 |
| INSERTION LOSS — MAXIMUM VALUE | dB | 15.2 | 6.4 | 3.5 | 3 | 0.6 | 0.4 | 0.4 |
| INSERTION LOSS — MINIMUM VALUE | dB | 2 | 1.5 | 1.5 | 0.5 | 0.1 | 0.07 | 0.05 |

OPTICAL CONNECTION COMPONENT

CROSS-REFERENCE TO RELATED APPLICATIONS

This application is a continuation application of PCT/JP2015/072120 filed on Aug. 4, 2015, the entire contents of which are incorporated herein by reference.

TECHNICAL FIELD

The present invention relates to an optical connection component to which a bend insensitive optical fiber (BIF, hereinafter simply referred to as the BI optical fiber) is applied as a bent optical fiber.

BACKGROUND ART

Along with miniaturization of an optical module, it is required to lower height of the optical fiber used in the vicinity of the optical module (to suppress low the height of the optical fiber from an electronic substrate or the like to which one end of the optical fiber is vertically connected).

In order to lower the height of the optical fiber, it is common to use a bent optical fiber obtained by formation of a bent portion at one end of the optical fiber. However, an amount of distortion to an outer periphery becomes excessively large when, for example, a part of the optical fiber is simply bent into a radius of curvature R (a curvature d [l/mm] is a reciprocal of the radius of curvature R) of 3 [mm] or less in order to form the bent portion. In such a situation, a possibility that the bent optical fiber is broken by excessive distortion increases. Therefore, a method of removing the distortion of the bent portion by heating the bent portion is often adopted. The following Patent Document 1 discloses a technology in which an optical fiber is melt by heating means using discharge and bending processing is performed. Note that, in the present specification, the bending processing in which the optical fiber is heated in this way is hereinafter referred to as heating bending processing. In contrast, the bending processing in which the optical fiber is not heated is hereinafter referred to as non-heating bending processing.

CITATION LIST

Patent Literature

Patent Document 1: Japanese Patent Application Laid-Open No. 2011-085718 (Japanese Patent No. 5506322)

SUMMARY OF INVENTION

Technical Problem

As a result of examination of the above-described prior art, the inventors have found the following problems. That is, as an optical fiber used in premises of a data center, a switching center, and the like (hereinafter referred to as the premises), a single mode optical fiber (hereinafter referred to as the SMF) is often applied in order to cope with long transmission distance due to increase in a scale of the premises. For this reason, an optical fiber for internal wiring of optical module, connected to the optical module as described above and the like, is also required to reduce connection loss with the SMF used in the premises. In particular, since the optical fiber is housed while lowering height thereof in a limited small wiring space in the optical module, it is desirable that a BI optical fiber having a trench structure is used as a refractive index structure of the optical fiber. The BI optical fiber is expected to reduce bending loss while suppressing increase in wavelength of a cutoff wavelength and implementing a single mode operation. Therefore, it is technologically advantageous to apply the BI optical fiber operating in a single mode as a bent optical fiber inserted as a part of premises wiring between the optical module and an external transmission line (SMF).

However, the above Patent Document 1 has not disclosed an optical connection component that bends a part of the SMF such that a radius of curvature R is 2.5 [mm] or less (a curvature d is 0.4 [l/mm] or more), and has low insertion loss at a predetermined wavelength.

According to the findings of the inventors, in heating bending processing, bending stress does not remain in the obtained bent optical fiber itself, and at the same time a photoelastic effect due to distortion disappears. Accordingly, as illustrated in FIG. 5C, an equivalent refractive index of a trench portion in a bent state in a glass region constituting the trench structure is higher than that in a case of non-heating bending processing (reduction of a light confinement effect by the trench structure).

FIG. 1 is a graph illustrating a comparison result between cases where a BI optical fiber of a sample 6 indicated in FIG. 6 to be described later is subjected to the heating bending processing and where the BI optical fiber is subjected to the non-heating bending processing (dependency of the bending loss on the radius of curvature). That is, a group G1 indicated by a symbol "●" in FIG. 1 indicates a relationship between the radius of curvature R [mm] and the bending loss [dB] in the BI optical fiber subjected to the non-heating bending processing. In addition, a group G2 indicated by a symbol "■" in FIG. 1 indicates a relationship between the radius of curvature R [mm] and the bending loss [dB] in the BI optical fiber subjected to the heating bending processing. Note that a bending angle θ of the BI optical fiber subjected to the heating bending processing is 82 [°]. In addition, the relationship between the radius of curvature R [mm] and the bending loss [dB] in the BI optical fiber subjected to the non-heating bending processing was measured in a state where a part of the BI optical fiber of the prepared sample 6 (portion to be a bent portion) is bent such that the bending angle θ becomes 82[°] using a mandrel having various curvatures d (=1/R). Note that a measurement wavelength is 1.31 [μm].

As can be seen from the comparison result of FIG. 1, when compared to the bending loss in the BI optical fiber subjected to the non-heating bending processing, the bending loss in the BI optical fiber subjected to the heating bending processing clearly increases even when the radius of curvature R is the same. Accordingly, when the SMF, in particular the BI optical fiber is simply applied as the bent optical fiber constituting a part of the wiring in an optical module, insertion loss of the bent optical fiber including the BI optical fiber increases. Therefore, it is necessary to apply a refractive index profile of the optical fiber in consideration of change in a bending rate due to the heating bending processing and to provide an appropriate curvature distribution according to the refractive index profile.

The present invention has been made in order to solve the above-described problems, and an object of the present invention is to provide an optical connection component having a structure that enables an application of the BI optical fiber subjected to the heating bending processing as the bent optical fiber in which increase in the insertion loss is effectively suppressed.

Solution to Problem

An optical connection component according to the present embodiment is comprised of $SiO_2$ glass as a main component, and includes a bent optical fiber in which a bent portion is formed in a section of a fixed length. Note that the bent portion includes a region where a curvature of the bent portion is maintained at 0.4 [1/mm] or more in a state where substantially no bending stress remains. In particular, the bent optical fiber at least includes a core, a first cladding surrounding the core, a second cladding surrounding the first cladding, and a third cladding surrounding the second cladding. A relative refractive index difference $\Delta 1$ of the core with respect to the third cladding, a relative refractive index difference $\Delta 2$ of the first cladding with respect to the third cladding, and a relative refractive index difference $\Delta 3$ of the second cladding with respect to the third cladding satisfy relationships of $\Delta 1 > \Delta 2 > \Delta 3$ and $\Delta 3 < -0.5$ [%]. The product V3 of the relative refractive index difference $\Delta 3$ and a cross-sectional area S of the second cladding is less than $-200$ [%·$\mu m^2$]. Further, the curvature in the bent portion is 0.6 [1/mm] or less over an entire length of the bent portion in the bent optical fiber.

Advantageous Effects of Invention

According to the present invention, a BI optical fiber subjected to heating bending processing can be applied as a bent optical fiber in which increase in insertion loss is effectively suppressed.

BRIEF DESCRIPTION OF DRAWINGS

FIGS. 2A and 2B illustrate use states of an optical connection component according to the present embodiment.

FIG. 6 is a table summarizing structural parameters of various samples of the BI optical fiber as the bent optical fiber applied to the optical connection component according to the present embodiment.

DESCRIPTION OF EMBODIMENTS

Description of Embodiment of Present Invention

Figure 1:
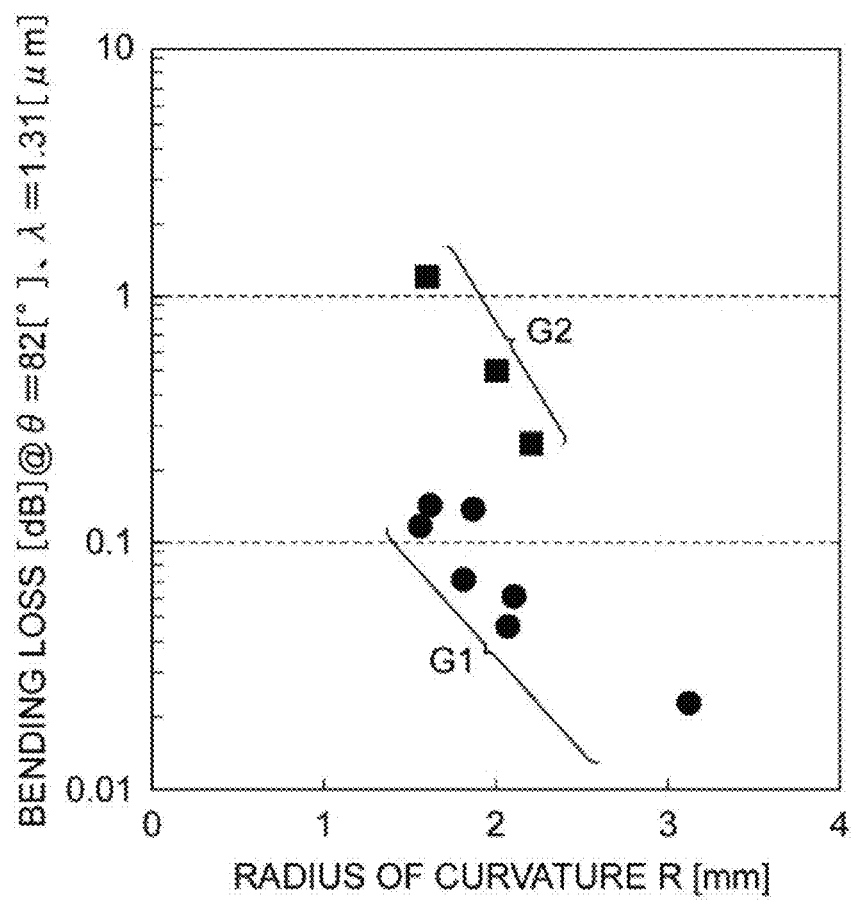
FIG. 1 is a graph illustrating a comparison result of a relationship between a radius of curvature R [mm] and bending loss [dB] in a BI optical fiber subjected to non-heating bending processing, and a relationship between a radius of curvature R [mm] and bending loss [dB] in a BI optical fiber subjected to heating bending processing.

First, each aspect of an embodiment of the present invention will be individually listed and described.

(1) An optical connection component according to the present embodiment is comprised of $SiO_2$ glass as a main component, and includes a bent optical fiber in which a bent portion is formed in a section of a fixed length. Note that the bent portion includes a region where a curvature d (a reciprocal of a radius of curvature R) of the bent portion is maintained at 0.4 [1/mm] or more in a state where substantially no bending stress remains. As one aspect of the present embodiment, the bent optical fiber at least includes a core, a first cladding surrounding the core, a second cladding surrounding the first cladding, and a third cladding surrounding the second cladding. A relative refractive index difference $\Delta 1$ of the core with respect to the third cladding, a relative refractive index difference $\Delta 2$ of the first cladding with respect to the third cladding, and a relative refractive index difference $\Delta 3$ of the second cladding with respect to the third cladding satisfy relationships of $\Delta 1 > \Delta 2 > \Delta 3$ and $\Delta 3 < -0.5$ [%]. The product V3 of the relative refractive index difference $\Delta 3$ and a cross-sectional area S of the second cladding is less than $-200$ [%·$\mu m^2$]. Further, the curvature d ($=1/R$) of the bent portion is 0.6 [1/mm] or less over an entire length of the bent portion in the bent optical fiber.

(2) As one aspect of the present embodiment, the bent optical fiber at least includes the bent portion, a first section formed continuously with one end of the bent portion, the curvature d in the first section being 0.1 [1/mm] or less, and a second section formed continuously with the other end of the bent portion, the curvature d in the second section being 0.1 [1/mm] or less. In this configuration, where an angle formed by two straight lines extending along the first section and a third section is $\theta$, the first section and a third section being positioned on both sides of the second section, insertion loss of the bent optical fiber at a wavelength of 1.31 [$\mu m$] is preferably $0.01 \times \theta$ [dB] or less. As one aspect of the present embodiment, in the bent optical fiber, it is preferable that a mode field diameter (hereinafter referred to as MFD) is 8.2 to 9.0 [$\mu m$] ($=8.6 \pm 0.4$ [$\mu m$]) at the wavelength of 1.31 [$\mu m$], a cutoff wavelength $\lambda c$ is 1260 [nm] or less measured on a 22 [mm] length of fiber, a glass outer diameter (corresponding to an outer diameter of the third cladding) is 80 [$\mu m$] or more, and multi-path interference (MPI) is suppressed to $-30$ [dB] or less at the wavelength of 1.31 [$\mu m$]. As one aspect of the present embodiment, in a target section where the curvature set along a longitudinal direction of the bent optical fiber is 0.3 [1/mm] or more, an absolute value of a curvature change rate $d_{max}/\Delta L$ is preferably 2 [1/$mm^2$] or less, the curvature change rate $d_{max}/\Delta L$ being defined by a maximum curvature $d_{max}$ in the target section and a shortest distance $\Delta L$ from a section edge of the target section to a position at which the maximum curvature $d_{max}$ is obtained. As one aspect of the present embodiment, in a target section where the curvature set along a longitudinal direction of the bent optical fiber is 0.4 [1/mm] or more, an absolute value of a curvature change rate $d_{max}/\Delta L$ is preferably 1.5 [1/$mm^2$] or less, the curvature change rate $d_{max}/\Delta L$ being defined by a maximum curvature $d_{max}$ in the target section and a shortest distance $\Delta L$ from a section edge of the target section to a position at which the maximum curvature $d_{max}$ is obtained. As one aspect of the present embodiment, fluctuation of the glass outer diameter of the bent optical fiber is 1 [μm] or less over the entire length of the bent portion. Note that the "fluctuation of the glass outer diameter" is defined by difference between a minimum glass outer diameter and a maximum glass outer diameter in the bent portion. As one aspect of the present embodiment, a fictive temperature in the bent portion is preferably 1100 [° C.] or less.

(3) Further, as one aspect of the present embodiment, the optical connection component may further include a fiber fixing component including a holding unit linearly holding one of the two sections (corresponding to the above-described first and the third sections) positioned on both sides of the bent portion (corresponding to the above-described second section), the two sections being continuous with the bent portion, the fiber fixing component being fixed to one of the two sections via the holding unit. In addition, as one aspect of the present embodiment, the holding unit of the fiber fixing component preferably includes a through-hole or a V-groove.

As described above, each aspect listed in this column of [Description of Embodiment of Present Invention] can be applied to each of all remaining aspects or to all combinations of these remaining aspects.

Details of Embodiment of Present Invention

Hereinafter, a specific structure of the optical connection component according to the present embodiment will be described in detail with reference to the attached drawings. Note that the present invention is not limited to these exemplifications, but is indicated by the claims, and it is intended to include meanings equivalent to the claims and all modifications within the scope of the claims.

FIGS. 2A and 2B illustrate use states of the optical connection component according to the present embodiment. In particular, FIG. 2A illustrates an electronic substrate 200 including an optical integrated circuit chip and the like, a bent optical fiber 100 at one end of which a bent portion BA subjected to heating bending processing is formed, and a connector 250 for optically connecting the bent optical fiber 100 and another optical fiber for wiring in an optical module or an SMF of an external transmission line. In the example of FIG. 2A, the bent optical fiber 100 includes a glass fiber (bared fiber) 110 and a resin coating 120 surrounding the glass fiber 110, and the resin coating 120 at the one end where the bent portion BA is formed has been removed. In addition, the one end where the bent portion BA is formed is provided substantially perpendicular to the electronic substrate 200 such that an optical input/output end surface of the bent optical fiber 100 and the optical integrated circuit chip and the like are efficiently and optically connected. Meanwhile, the connector 250 is attached to the other end of the bent optical fiber 100.

In an example of FIG. 2B, a connection structure between the one end of the bent optical fiber 100 and the electronic substrate 200 is different from that in the example of FIG. 2A. That is, in the example of FIG. 2B, a fiber fixing component 300 is fixed to the one end of the bent optical fiber 100. By optical connection between the optical input/output end surface of the bent optical fiber 100 and the optical integrated circuit chip and the like via the fiber fixing component 300 in this way, mechanical strength at a connecting portion can be improved.

Figure 3A:
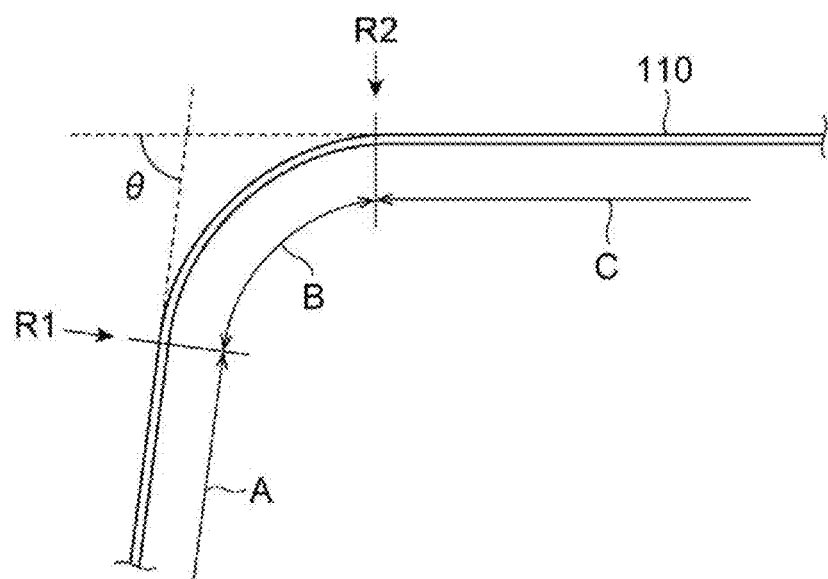
FIGS. 3A and 3B illustrate a structure and an example of a curvature distribution of a bent portion and the vicinity thereof of a bent optical fiber applied to the optical connection component according to the present embodiment.
Figure 3B:
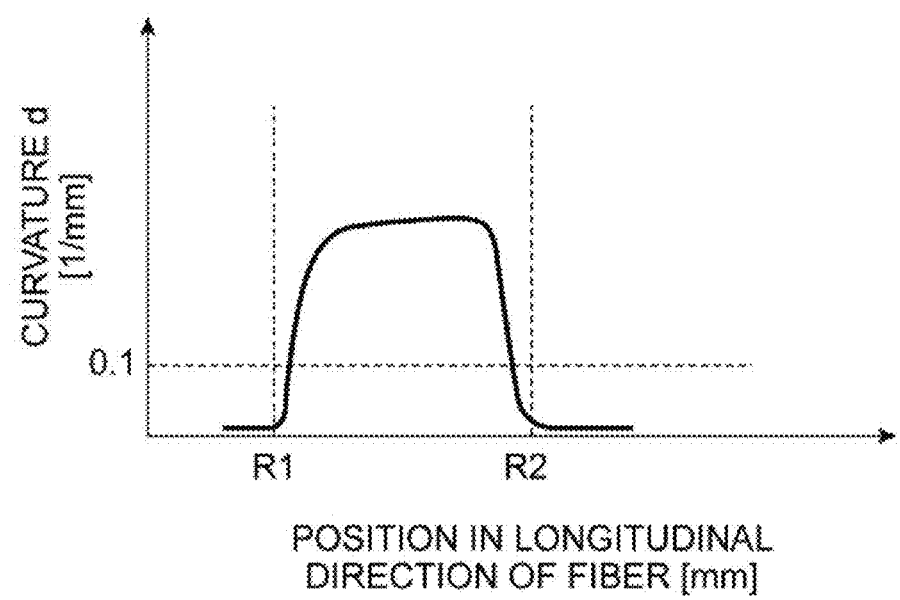

FIG. 3A illustrates a structure in the vicinity of the bent portion BA formed at the end of the bent optical fiber 100 illustrated in FIGS. 2A and 2B, that is, an end of the glass fiber 110 where the resin coating 120 has been removed, and FIG. 3B illustrates an example of a curvature distribution of the bent portion BA and the vicinity thereof.

In the present embodiment, as illustrated in FIGS. 3A and 3B, the bent portion BA and the vicinity thereof (the end of the bent optical fiber 100) includes a region A (the first section continuous with the bent portion BA) where the curvature d is 0.1 [1/mm] or less, a region B (a section corresponding to the bent portion BA, which has been subjected to the heating bending processing) where the curvature d is 0.4 [1/mm] or more, and a region C (the second section continuous with the bent portion BA) where the curvature d is 0.1 [1/mm] or less. Here, as illustrated in FIG. 3A, since a bent shape is maintained in the section subjected to the heating bending processing (the bent portion BA) without fixing both ends of the section, no bending stress remains in the section. On the other hand, a bent state cannot be maintained in a section subjected to non-heating bending processing without fixing both ends of the section, and in the section subjected to the non-heating bending processing, the bending stress always remains while the bent state is maintained.

Note that, in FIG. 3A, R1 indicates a boundary between the regions A and B, and R2 indicates a boundary between the regions B and C. The regions A to C are the continuous sections of the bent optical fiber 100. In addition, in the present specification, a "bending angle θ" is defined by two straight lines extending along the regions A and C positioned on both sides of the region B (the bent portion BA), as illustrated in FIG. 3A. Although the insertion loss changes depending on the angle (the bending angle) θ formed by the regions A and C, in the present embodiment, a refractive index profile (for example, see FIG. 5A) and a curvature distribution (for example, see FIG. 8A) are designed such that the insertion loss of the bent optical fiber at the wavelength of 1.31 [μm] is 0.01×θ [dB] or less.

A burner, a $CO_2$ laser, arc discharge, a heater, and the like can be used for the heating bending processing to the region B corresponding to the bent portion BA. Since the $CO_2$ laser can easily adjust irradiation intensity, an irradiation range, and irradiation time, the $CO_2$ laser has a characteristic advantageous for precise control of the curvature distribution. Since glass is opaque in the vicinity of a general wavelength of 10 [μm] of the $CO_2$ laser, it is considered that irradiation energy of the $CO_2$ laser is absorbed by a surface layer of the optical fiber and is transmitted by re-radiation and heat conduction. In a case where power of the $CO_2$ laser is too high, a surface layer temperature of the optical fiber steeply increases to an evaporation temperature of the glass, and as a result, a surface shape of the optical fiber cannot be maintained. Therefore, irradiation power of the $CO_2$ laser is suitably adjusted such that distortion is removed by continuation of a state where surface layer glass of the optical fiber does not evaporate and a temperature of the optical fiber increased at a fiber cross section of a heated portion to be higher than a working point. Note that a cooling rate of the temperature of the optical fiber (the bent optical fiber) subjected to the heating bending processing is desirably $10^{-4}$ [° C./second] or less.

When instantaneous heating is performed, the distortion remains in the optical fiber, and accordingly the bent portion is liable to break due to a mechanical impact and a load. Therefore, in the present embodiment, by performing heating such that the fictive temperature indicating a thermal history of the glass becomes 1100 [° C.] or less, the bent optical fiber having high mechanical reliability can be obtained even when the bent optical fiber is bent at the radius of curvature R of 2.5 [mm] or less (the curvature of 0.4 [1/mm] or more). The fictive temperature of the optical fiber to be the bent optical fiber can be evaluated by measurement of a Raman scattering spectrum and an infra-red (IR) absorption spectrum. A relationship between the IR absorption spectrum and the fictive temperature can be obtained using a method described in D.-L. Kim et al., J. Non-Cryst. Solids, vol. 286, (2001) pp. 136-138 (Non-Patent Document 1), for example.

In addition, the curvature d of the bent portion BA subjected to the heating bending processing can be suitably measured by a microscope type shape measuring instrument (for example, Quick Vision Apex Pro manufactured by Mitutoyo Corporation) equipped with a commercially available high precision stage. According to the microscope type shape-measuring instrument, as illustrated in FIG. 3B, coordinates of an outer surface of the bent portion BA and the vicinity thereof of the obtained bent optical fiber 100 are evaluated, and the radius of curvature R at each position can be obtained from the obtained two-dimensional coordinates. Note that, in a case where an apparent curvature d and an apparent curvature change rate become large due to accuracy of an evaluation machine to be used, a foreign matter on an outer periphery of the bent optical fiber to be evaluated, and the like, an abnormal point can be removed or corrected by smoothing a curvature value by moving average.

Figure 4A:
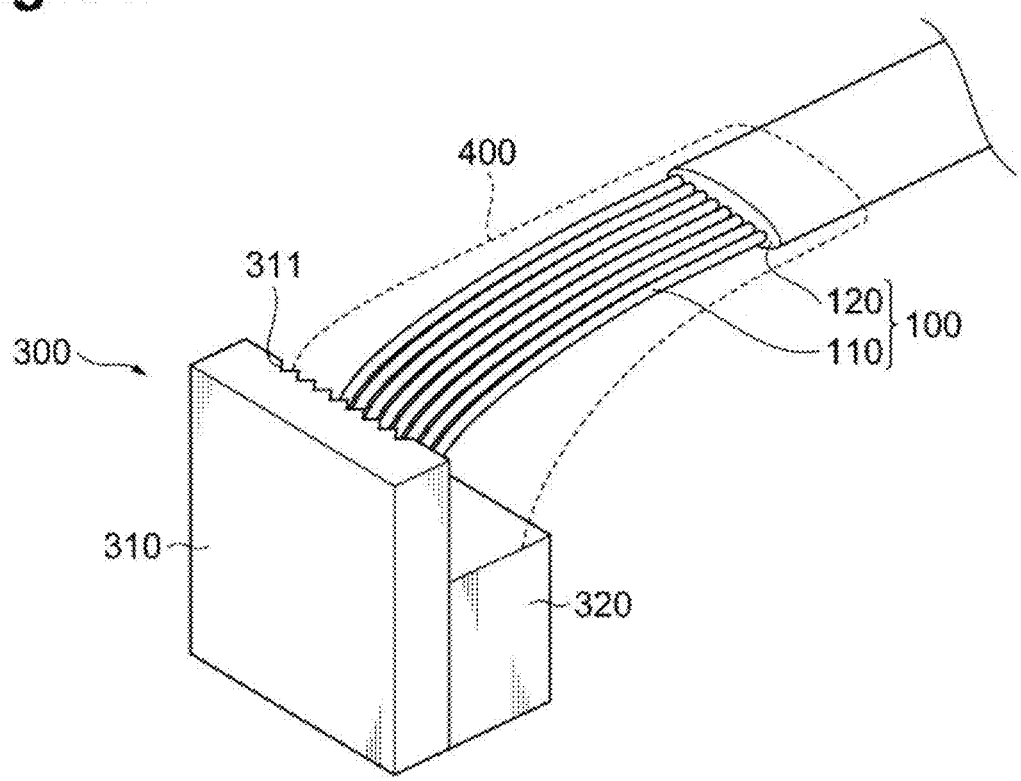
FIGS. 4A and 4B illustrate a structure of an example of a fiber fixing component applied to the optical connection component according to the present embodiment.
Figure 4B:
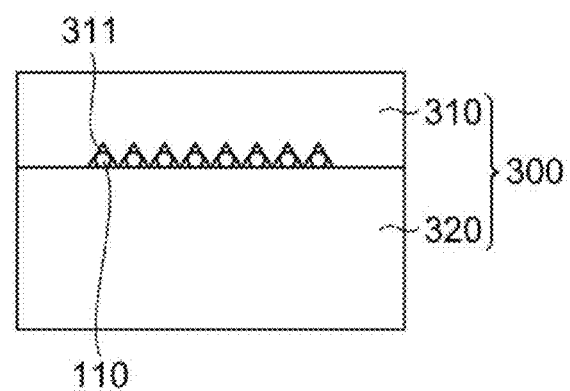

FIGS. 4A and 4B illustrate a structure of an example of the fiber fixing component applied to the optical connection component according to the present embodiment. Note that FIG. 4A is a perspective view of the fiber fixing component 300 fixed to the end where the resin coating 120 has been removed (the glass fiber 110) of the bent optical fiber 100, and FIG. 4B is a plan view illustrating a bottom structure of the fiber fixing component 300.

In examples illustrated in FIGS. 4A and 4B, the fiber fixing component 300 includes a V-groove substrate 310 provided with V-grooves 311 in which a section corresponding to the region A of FIG. 3A of the end of the bent optical fiber 100, that is, the end of the glass fiber 110 is provided, and a lid 320 for pressing the end of the glass fiber 110 against the V-grooves 311. Note that a section of the glass fiber 11, which is exposed from the fiber fixing component 300, is covered with a potting resin 400 for protecting the bent portion BA. In addition, as illustrated in FIG. 4B, the V-grooves 311 and the lid 320 function as through-holes that hold the end of the glass fiber 110. Therefore, the fiber fixing component 300 may be composed of a single member provided with a plurality of through-holes in place of the V-groove substrate 310 and the lid 320 described above.

In the case where the fiber fixing component 300 is composed of the single member having the through-holes, a single core optical connector such as a FC connector, an SC connector, and an LC connector, or a multicore connector such as an MPO connector and an MT connector can be applied as the fiber fixing component 300. Meanwhile, multi-component glass such as Pyrex (registered trademark), a Si substrate, and the like can be applied as a material of the V-groove substrate 310. Incidentally, in order to perform adhesion using an optical integrated circuit and a UV curing resin, a material that transmits UV light is preferably used. Further, a Young's modulus of an outer periphery of the potting resin 400 for protecting the bent portion BA is desirably 20 MPa or more. A more desirable Young's modulus is 1000 MPa or more.

As described above, since the fiber fixing component 300 includes the holding unit (the V-groove or the through-hole) that linearly holds the end of the glass fiber 110 formed with the bent portion BA, height can be lowered. In addition, since the fiber fixing component 300 having the structure illustrated in FIGS. 4A and 4B is fixed to the one end of the bent optical fiber 100, connection to the above-described electronic substrate 200, other optical components, the connector, and the like is facilitated Further, a light input/output end surface of the bent optical fiber 100 to which the fiber fixing component 300 is fixed may have a certain angle with respect to a fiber axis (an optical axis AX illustrated in FIG. 5A). For example, by inclination of the optical input/output end surface with respect to the fiber axis by 8[°], reflection loss can be made large with respect to a light source, a light receiver, and a waveguide connected to a bottom surface of the fiber fixing component 300, and stable transmission performance can be obtained.

Figure 5A:
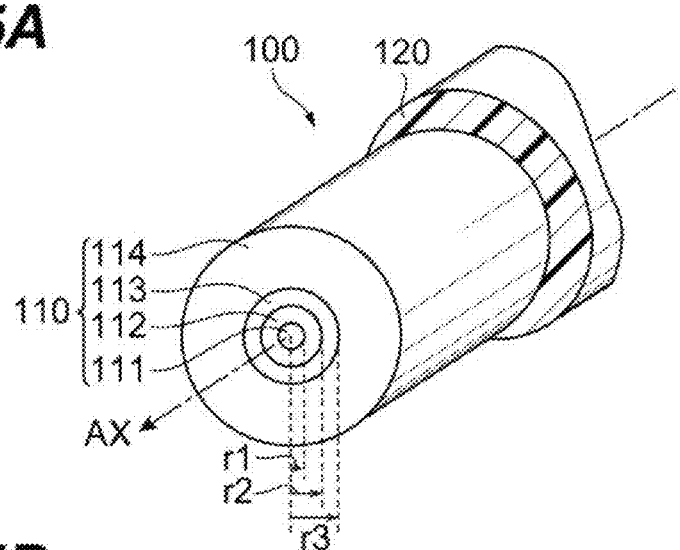
FIGS. 5A to 5C illustrate a cross-sectional structure and refractive index profiles of the BI optical fiber as the bent optical fiber applied to the optical connection component according to the present embodiment.
Figure 5B:
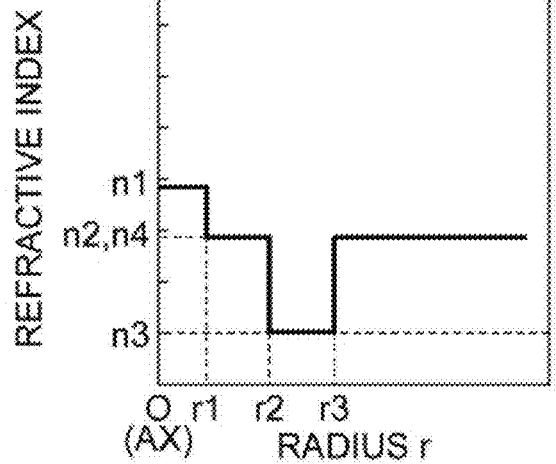
Figure 5C:
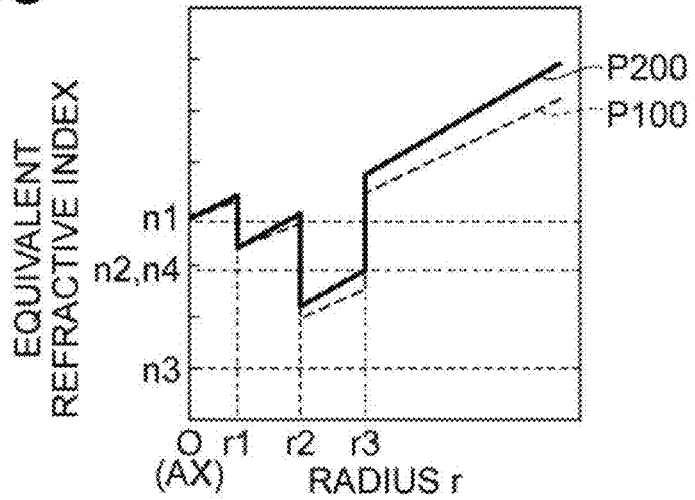

FIGS. 5A to 5C illustrate a cross-sectional structure of the BI optical fiber as the bent optical fiber 100 applied to the optical connection component according to the present embodiment, and refractive index profiles of the BI optical fiber. Note that FIG. 5A illustrates the cross-sectional structure of the BI optical fiber, FIG. 5B illustrates the refractive index profile of the BI optical fiber illustrated in FIG. 5A, and FIG. 5C is an equivalent refractive index profile of the BI optical fiber illustrated in FIG. 5A in a state where bending processing has been performed on the BI optical fiber.

As illustrated in FIGS. 5A and 5B, the BI optical fiber includes a core 111 having a radius r1 extending along a predetermined axis (the optical axis AX), a first cladding 112 having a radius r2 provided on an outer peripheral surface of the core 111, a second cladding 113 having a radius r3 provided on the outer peripheral surface of the first cladding 112, and a third cladding 114 (a region constituting a trench structure of the BI optical fiber) provided on an outer peripheral surface of the second cladding 113. In addition, a refractive index of the core 111 is n1, a refractive index of the first cladding 112 is n2 (<n1), a refractive index of the second cladding 113 is n3 (<n2), and a refractive index of the third cladding 114 is n4 (<n1, >n3). Further, the relative refractive index difference Δ1 of the core 111 with respect to the third cladding 114, the relative refractive index difference Δ2 of the first cladding 112 with respect to the third cladding 114, and the relative refractive index difference Δ3 of the second cladding 113 with respect to the third cladding 114 satisfy relationships of Δ1>Δ2>Δ3 and Δ3<−0.5 [%].

The relative refractive index difference (Δ) of each part based on the third cladding 114 is a value determined by an equivalent step index (ESI). The outer diameter of each of the first to third claddings 112, 113, and 114 is decided using a value obtained by determining a position where a derivative value of change in a radial direction of the refractive index is the maximum in the vicinity of boundaries between the claddings.

In addition, composition of the BI optical fiber having the structure as described above is produced by appropriately adding a dopant for controlling a refractive index to the $SiO_2$ glass. As an example, the core 111 includes $SiO_2$ glass to which $GeO_2$ is added, the first cladding 112 includes pure $SiO_2$ glass, the second cladding 113 constituting the trench structure includes $SiO_2$ glass to which fluorine is added, and the third cladding 114 includes the pure $SiO_2$ glass. Such glass composition is excellent in terms of economy and shape controllability. Note that Cl may be added to the third cladding 114. In addition, the core 111 may be co-added with the $GeO_2$ and the fluorine.

Desirably, the BI optical fiber applied as the bent optical fiber 100 of the optical connection component according to the present embodiment has a transmission characteristic equivalent to that of a general-purpose SMF (hereinafter referred to as SSMF) conforming to ITU-TG.652, and can be economically connected to other SSMFs with low loss. In the BI optical fiber having a low bending loss property, bending loss in a higher order mode is also low, and accordingly, the MPI generally tends to be high. Therefore, in the present embodiment, a refractive index structure of the core 111 is set such that the cutoff wavelength λc measured on a fiber having a length of 22 [mm] becomes 1260 [nm] or less. As a result, the BI optical fiber in which the MPI generated by interference with the higher order mode is −30 dB or less can be obtained, and a signal quality required for a digital signal can be maintained. In addition, when the MFD at the wavelength of 1.31 [μm] is 8.6±0.4 [μm], the transmission characteristic is equivalent to that of the SSMF, and the BI optical fiber can be connect to the SSMF with low loss. Note that, when a fiber diameter (the outer diameter of the glass fiber 110) is made small, the distortion when the fiber is bent becomes small. In this case, an effect that a housing property increases can be obtained. On the other hand, however, when a shape of the fiber is made too thin, molding accuracy of a ferrule of a multicore optical connector manufactured by a molding method is reduced. Therefore, the BI optical fiber applicable to the bent optical fiber 100 of the present embodiment preferably has the glass outer diameter of 80 [μm] or more and 125 [μm] or less.

Note that, as described above, in a case where the bent portion is formed in the BI optical fiber, as illustrated in FIG. 5C, since a photoelastic effect due to the distortion disappears, equivalent refractive indexes of the first to third claddings 112, 113, and 114 surrounding the core 111 in the bent state become higher than the refractive index before the heating bending processing is performed. In FIG. 5C, P100 is the equivalent refractive index profile of the BI optical fiber having the bent portion with the radius of curvature R=2 mm formed by the non-heating bending processing, and P200 is the equivalent refractive index profile of the BI optical fiber having the bent portion with the radius of curvature R=2 mm formed by the heating bending processing. In this case, an effect of the trench structure (a light confinement effect) in the BI optical fiber is reduced, and accordingly, the bending loss increases. Therefore, the present inventors considered, taking the disappearance of the photoelastic effect into account in advance, optimal conditions of the curvature, the curvature distribution, and the trench structure in order to apply the SMF such as the BI optical fiber to the bent optical fiber 100 of the present embodiment.

FIG. 6 is a table summarizing structural parameters of various samples of the BI optical fiber prepared to decide the optimal conditions of the curvature and the trench structure. Note that FIG. 6 indicates, for each of prepared samples 1 to 7, the relative refractive index difference Δ1 of the core with respect to the third cladding, the relative refractive index difference Δ2 of the first cladding with respect to the third cladding, the relative refractive index difference Δ3 of the second cladding with respect to the third cladding, the radius r1 (an outer diameter 2r1) of the core, the radius r2 (an outer diameter 2r2) of the first cladding, the radius r3 (an outer diameter 2r3) of the second cladding, an outer diameter ratio r1/r2 of the core and the first cladding, an outer diameter ratio r2/r3 of the first cladding and the second cladding, the product V3 (a refractive index volume defining the trench structure) of the relative refractive index difference Δ3 of the second cladding constituting the trench structure and the cross-sectional area S of the second cladding, and the insertion loss (an average value, a maximum value, and a minimum value) at the wavelength of 1.31 [μm]. Note that the insertion loss was measured in a state where the samples 1 to 7 were subjected to the heating bending processing such that the bending angle θ becomes 82 [°] in a state where the radius of curvature R is 2.0 [mm] to 2.5 [mm] (the curvature of 0.4 to 0.5).

Figure 7:
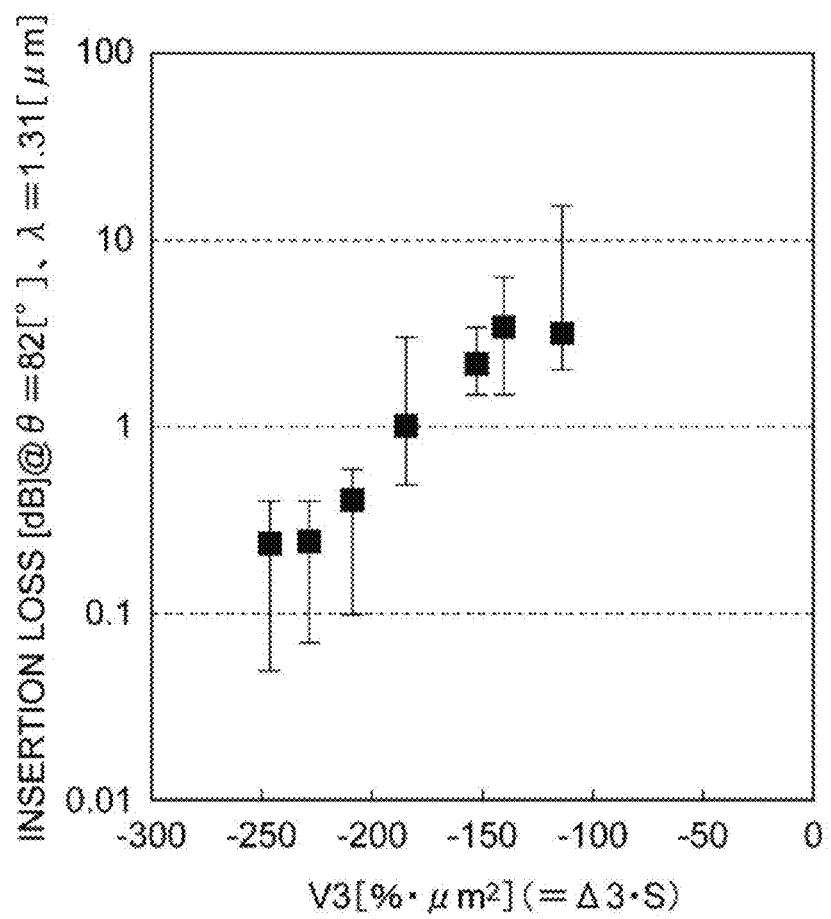
FIG. 7 is a graph illustrating, for each of the samples indicated in FIG. 6, a relationship between insertion loss [dB] and a volume parameter V3 that defines a trench structure.

FIG. 7 is a graph illustrating a relationship between the insertion loss [dB] and a refractive index volume V3 defining the trench structure of each of the samples 1 to 7 (subjected to the heating bending processing) indicated in FIG. 6. As can be seen from FIG. 7, when the radius of curvature R=2.5 [mm] or less, in order to suppress the insertion loss at the wavelength of 1.31 [μm] to 1 [dB] or less, the refractive index volume V3 of the trench structure is suitably −200 [%·μm²] or less.

Figure 8A:
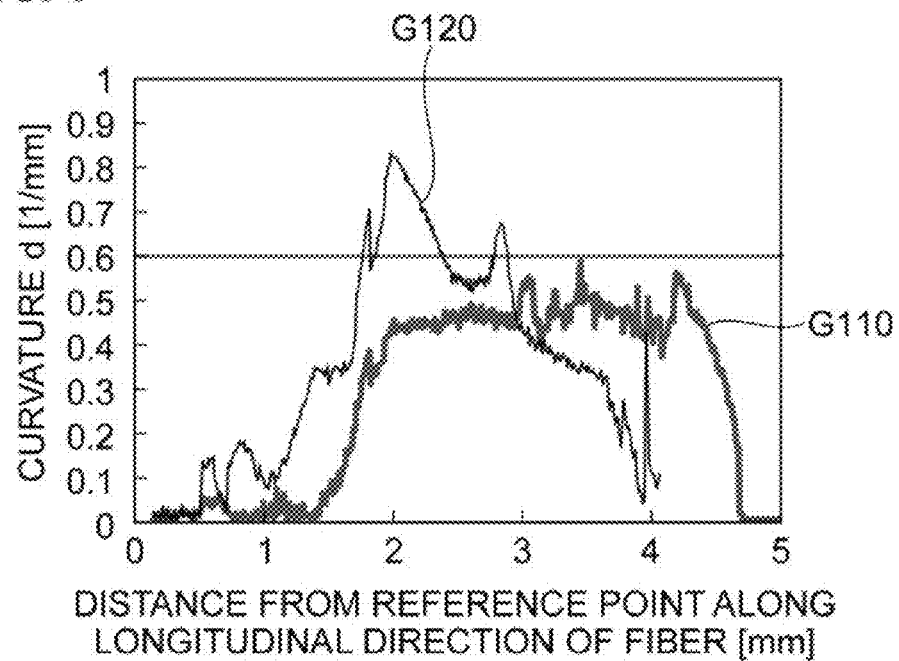
FIGS. 8A and 8B illustrate, with respect to a sample 6 indicated in FIG. 6, an example of two kinds of curvature distributions, and a graph illustrating a relationship between a maximum curvature $d_{max}$ [1/mm] and the insertion loss [dB] in the bent portion.
Figure 8B:
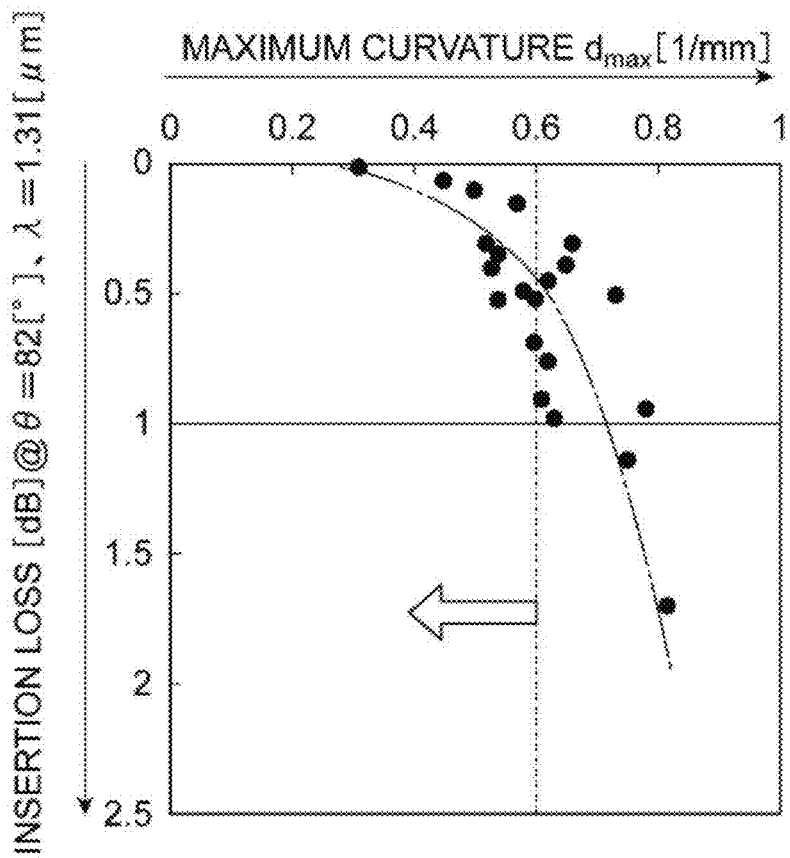

In addition, FIG. 8A is a graph illustrating examples of two kinds of the curvature distributions of the sample 6 indicated in FIG. 6, and FIG. 8B is a graph illustrating a relationship between the maximum curvature $d_{max}$ [1/mm] and the insertion loss [dB] in the bent portion.

In FIG. 8A, although graphs G110 and G120 are the examples of the sample in which average values of the curvature d in the bent portion are substantially the same, the graph G110 is the curvature distribution of the sample in which the maximum value $d_{max}$ of the curvature in the bent portion is suppressed to 0.6 [1/mm] or less, and the insertion loss at the wavelength of 1.31 [μm] was 0.20 [dB]. Meanwhile, the graph G120 is the curvature distribution of the sample in which a fluctuation range of the curvature in the bent portion is enlarged beyond 0.6 [1/mm], and the insertion loss at the wavelength of 1.31 [μm] was 1.70 [dB].

As described above, even when the average values of the curvature d in the bent portion are substantially the same, when there is a portion exceeding the curvature of 0.6 [1/mm] in a part of a processed portion, the loss increases abruptly. Note that a state of the curvature distribution in the bent portion BA is preferably not abruptly changed in order to maintain low insertion loss. In the present embodiment, in the target section where the curvature set along the longitudinal direction of the bent optical fiber is 0.3 [1/mm] or more, the absolute value of the curvature change rate $d_{max}/\Delta L$ is 2 [1/mm²] or less, the curvature change rate $d_{max}/\Delta L$ being defined by the maximum curvature $d_{max}$ in the target section and the shortest distance $\Delta L$ from the section edge of the target section to the position at which the maximum curvature $d_{max}$ is obtained. Note that, in the target section where the curvature set along the longitudinal direction of the bent optical fiber is 0.4 [1/mm] or more, the absolute value of the curvature change rate $d_{max}/\Delta L$ is preferably 1.5 [1/mm²] or less. In addition, in order to suppress fluctuation of the curvature d along the longitudinal direction of the bent optical fiber 100, in the present embodiment, the fluctuation of the glass outer diameter of the bent optical fiber 100 is 1 [μm] or less over the entire length of the bent portion BA. Note that the glass outer diameter of the bent optical fiber 100 means the outer diameter of the glass fiber 110 and substantially coincides with the outer diameter of the third cladding.

Note that, as can be seen from FIG. 8B, by setting the maximum curvature $d_{max}$ in the bent portion to 0.6 [1/mm] or less, the obtained insertion loss of the bent optical fiber can be suppressed to 1 [dB] or less. Note that, more preferably, the curvature d is 0.5 [l/mm] or less.

REFERENCE SIGNS LIST

100 . . . Bent optical fiber (BI optical fiber); 110 . . . Glass fiber (Bared fiber); 111 . . . Core; 112 . . . First cladding; 113 . . . Second cladding; 114 . . . Third cladding; BA . . . Bent portion; 300 . . . Fiber fixing component; 310 . . . V-groove substrate; and 311 . . . V-groove, 320 . . . Lid.

The invention claimed is:

1. An optical connection component comprising
a bent optical fiber having:
a glass fiber mainly comprising of $SiO_2$ glass; and
a resin coating surrounding the glass fiber while being removed from an end of the glass fiber,
wherein
the glass fiber at least includes a core, a first cladding surrounding the core, a second cladding surrounding the first cladding, and a third cladding surrounding the second cladding,
a relative refractive index difference $\Delta 1$ of the core with respect to the third cladding, a relative refractive index difference $\Delta 2$ of the first cladding with respect to the third cladding, and a relative refractive index difference $\Delta 3$ of the second cladding with respect to the third cladding satisfy relationships of $$\Delta 1 > \Delta 2 > \Delta 3 \text{ and } \Delta 3 < -0.5 [\%],$$

a product V3 of the relative refractive index difference $\Delta 3$ and a cross-sectional area S of the second cladding is less than $-200 \, [\% \cdot \mu m^2]$, and
the end of the glass fiber includes
a bent portion including a region where a curvature of the bent portion is maintained at 0.4 [l/mm] or more in a state where substantially no bending stress remains, the curvature in the bent portion being 0.6 [l/mm] or less over an entire length of the bent portion, and
wherein
in a target section where the curvature set along a longitudinal direction of the bent optical fiber is 0.4 [l/mm] or more, an absolute value of a curvature change rate $d_{max}/\Delta L$ is 1.5 [l/mm$^2$] or less, the curvature change rate $d_{max}/\Delta L$ being defined by a maximum curvature $d_{max}$ in the target section and a shortest distance $\Delta L$ from a section edge of the target section to a position where the maximum curvature $d_{max}$ is obtained.

2. The optical connection component according to claim 1, wherein
the bent optical fiber at least includes a first section formed continuously with at one end of the bent portion, the curvature in the first section being 0.1 [l/mm] or less, and a second section formed continuously with at the other end of the bent portion, the curvature in the second section being 0.1 [l/mm] or less, and
where an angle formed by two straight lines extending along the first section and the second section is $\theta$ [deg], the first section and the second section being positioned on both sides of the bent portion, and an insertion loss of the bent optical fiber at a wavelength of 1.31 [µm] is $0.01 \times \theta$ [dB] or less.

3. The optical connection component according to claim 1, wherein the bent optical fiber has a mode field diameter of 8.2 to 9.0 [µm] at a wavelength of 1.31 [µm], a cutoff wavelength of 1260 [nm] or less measured on a 22 [mm] length of fiber, a glass outer diameter of 80 [µm] or more, and multi-path interference of −30 [dB] or less at the wavelength of 1.31 [µm].

4. The optical connection component according to claim 1, wherein in a target section where the curvature set along a longitudinal direction of the bent optical fiber is 0.3 [l/mm] or more, an absolute value of the curvature change rate $d_{max}/\Delta L$ is 2 [l/mm$^2$] or less.

5. The optical connection component according to claim 1, wherein a fluctuation of a glass outer diameter of the bent optical fiber is 1 [µm] or less over the entire length of the bent portion.

6. The optical connection component according to claim 1, wherein a fictive temperature of the optical fiber in the bent portion is 1100 [° C.] or less.

7. The optical connection component according to claim 1, wherein the end of the glass fiber further includes:
a first section continuous with the bent portion and positioned between the bent portion and the resin coating; and
a second section continuous with the bent portion and positioned so that the first and the second sections sandwich the bent portion.

8. The optical connection component according to claim 7, further comprising a potting resin provided between the bent portion and the resin coating while surrounding both the bent portion and the first section.

9. The optical connection component according to claim 7, further comprising a fiber fixing component including a holding unit holding only the second section to maintain the second section in a linear shape, the fiber fixing component being fixed to the second section via the holding unit.

10. The optical connection component according to claim 9, wherein the holding unit of the fiber fixing component includes a through-hole or a V-groove.

* * * * *